United States Patent [19]
Chiou

[11] Patent Number: 5,408,279
[45] Date of Patent: Apr. 18, 1995

[54] EYE GLASSES DESIGNED TO FACILITATE CARRYING

[76] Inventor: Ching-Hae Chiou, No. 5, Sheng An Road, Tainan, Taiwan, Prov. of China, 709

[21] Appl. No.: 141,536

[22] Filed: Oct. 27, 1993

[51] Int. Cl.⁶ ............................................. G02C 5/14
[52] U.S. Cl. .................................. 351/121; 351/130; 351/158
[58] Field of Search ............... 351/111, 112, 116, 121, 351/130, 133, 140, 141, 149, 150, 153, 155, 158, 41, 124, 125

[56] References Cited

U.S. PATENT DOCUMENTS

| | | | |
|---|---|---|---|
| 1,898,059 | 2/1933 | McDonald | 351/112 |
| 3,762,804 | 11/1973 | Livas | 351/116 |
| 5,032,017 | 7/1991 | Bolle et al. | 351/116 |

FOREIGN PATENT DOCUMENTS 2468189 5/1981 France ................................. 351/112

Primary Examiner—William L. Sikes
Assistant Examiner—Hung Xuan Dang

[57] ABSTRACT

A type of eyeglasses designed to facilitate carrying, principally consisting of a frame, a set of elastic pieces, a set of temples, a set of springs, a pressing piece, a pawling piece, a positioning unit, a clip and several screw bolts. The eyeglasses assembled can be attached onto a belt by means of the clip on the bridge of the frame to facilitate carrying and prevent mishaps, such as misplacing and dropping the eyeglasses, from occurring. The elastic pieces, which are shaped like an accordion, and the set of temples are designed to be elastic, so that the pair of eyeglasses can be bound securely onto the belt, not affected by the waistline of the user.

1 Claim, 7 Drawing Sheets

EYE GLASSES DESIGNED TO FACILITATE CARRYING

DESCRIPTION OF THE INVENTION

The present invention concerns eyeglasses designed to facilitate carrying. More specifically, the present invention concerns eyeglasses that can be attached securely onto a belt or the waist and involves the employment of an elastic piece to connect the temple of the eyeglasses to the frame, thereby allowing eye-glasses temple to be flexible and capable of being unfolded appreciably.

In light of the fact that eyeglasses are not convenient to carry and can be lost or misplaced easily, the inventor of the present invention conducted diligent research aimed at solving the aforesaid problems and arrived at the present invention after designing eyeglasses that facilitate carrying.

The principal objective of the present invention is to present eyeglasses that are convenient to carry, are designed attractively, and can be attached to the waist or a belt.

The eyeglasses pertaining to the present invention possess the following principal characteristics. The middle of the upper part of an eye-glasses frame is equipped with a housing slot, with the two sides of the upper part thereof being equipped with a set of threaded holes and the two sides about the center of said housing slot each being equipped with an insertion slot. Additionally, the front of said housing slot possesses a half-circle recessed slot, and the rear of the said housing slot is equipped with an elevated shaft hole. A spring is inserted into each of said two insertion slots, and a pressing piece is placed on said two springs. The upper part of said pressing piece is equipped with a curved unit, and the middle thereof possesses a curved slot onto which a pawling piece is to be placed. One side of said pawling piece is equipped with a switch, and the other side is equipped with a switch, and the other side is equipped with an eccentric protruding piece, with the outer side thereof equipped with a supporting shaft. A positioning unit is fastened onto the aforesaid housing slot by means of a set of screw bolts. Specifically, the two sides of the upper part of said positioning unit are each equipped with a threaded hole in alignment with the aforesaid threaded hole on said housing slot, and the lower side of the front section of said positioning unit is equipped with a recessed slot that corresponds with the half-circle recessed slot located on said eye-glasses frame. The rear of said positioning unit is equipped with a notch, and the two sides of said notch are each equipped with an insertion hole. Moreover, a clip is mounted inside the notch of said positioning unit, with the front two sides of said clip each possessing a hook, bending downward. The outer sides of said pair of hooks each possesses a protruding rod, and the inner side of one of said hooks is equipped with a positioning slot. Additionally, the rear of said clip is equipped with a clip pin.

A preferred practical example including figures is described below for explaining the technical means employed for achieving the aforesaid merits and objectives pertaining to the present invention.

Figure 1:
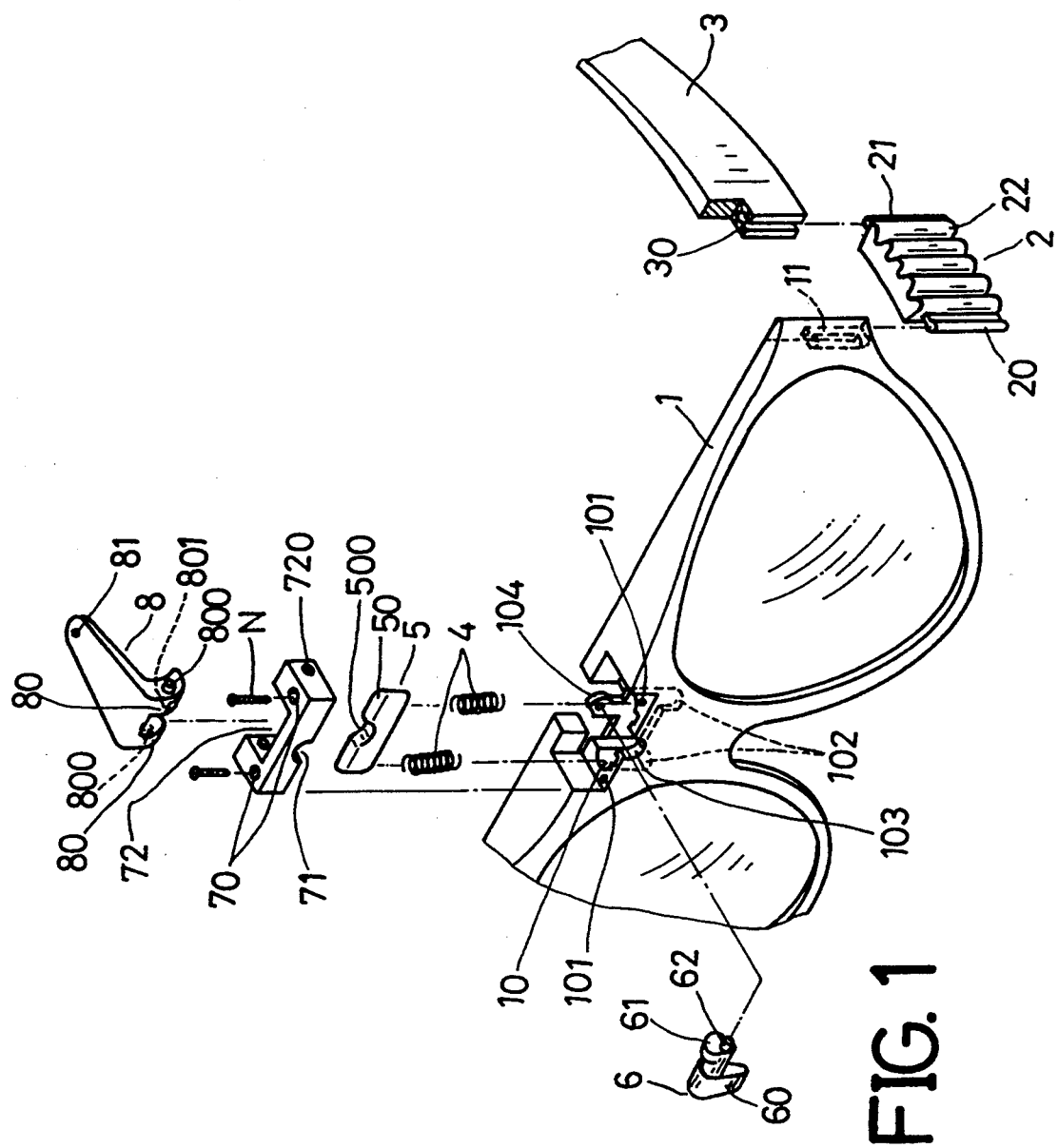
FIG. 1: A three-dimensional dissection drawing showing the eyeglasses pertaining to the practical example of the present invention.

As shown in FIG. 1, the eyeglasses designed to facilitate carrying pertaining to the present invention consists of (1) an eyeglasses frame 1, wherein the middle of the upper part of said eye-glasses frame 1 is equipped with a housing slot 10, with the two sides of the upper part thereof each being equipped with a threaded hole 101 and the two sides about the center of said housing slot 10 each being equipped with an insertion slot 102, the front of said housing slot 10 possesses a half-circle recessed slot 103 and the rear of said housing slot 10 is equipped with an elevated shaft hole 104, and the two sides of said eye-glasses frame 1 each possesses a vertical insertion slot 11, (2) a set of elastic pieces 2, wherein the front and rear sections thereof possess protruding strips 20 and 21 respectively, one end of said elastic piece 2 is to be inserted into said insertion slot 11, and said elastic piece 2 is equipped with a flexible section 22, with the outer side thereof being shaped like an accordion, (3) a set of temples 3, wherein said temple 3 is curved and the front thereof is equipped with a joining groove 30 with which said temples 3 can be attached onto said protruding strip 21, (4) a set of springs 4, wherein said spring 34 is to be inserted into each of said two insertion slots 102, (5) a pressing piece 5, wherein said pressing piece 5 is to be placed on said two springs 4, the upper part of said pressing piece 5 is equipped with a curved unit 50, and the middle thereof possesses a curved slot 500, (6) a pawling piece 6, wherein said pawling piece rests on the curved slot 500 of said pressing piece 5, one side of said pawling piece 6 is equipped with a switch 60, and the other side is equipped with an eccentric protruding piece 61, with the outer side thereof equipped with a supporting shaft 62, (7) a positioning unit 7, wherein said positioning unit 7 is fastened onto the aforesaid housing slot 10 by means of a set of screw bolts N. The two sides of the upper part of said positioning unit 7 are each equipped with a threaded hole 70 in alignment with the aforesaid threaded hole 101 on said housing slot 10, the lower side of the front section of said positioning unit 7 is equipped with a recessed slot 71 that corresponds with the half-circle recessed slot 103 located on said eye-glasses frame 1, and the rear of said positioning unit 7 is equipped with a notch 72 and the two sides of said notch 72 are each equipped with an insertion hole 720, and (8) a clip 8, wherein said clip 8 is mounted inside the notch 72 of said positioning unit 7, with the front two sides of said clip 8 each possessing a hook 80, bending downward, the outer sides of said pair of hooks 80 each possesses a protruding rod 800 and the inner side of one of said hooks 80 is equipped with a positioning slot 801, and the rear of said clip 8 is equipped with a clip pin 81.

Figure 2:
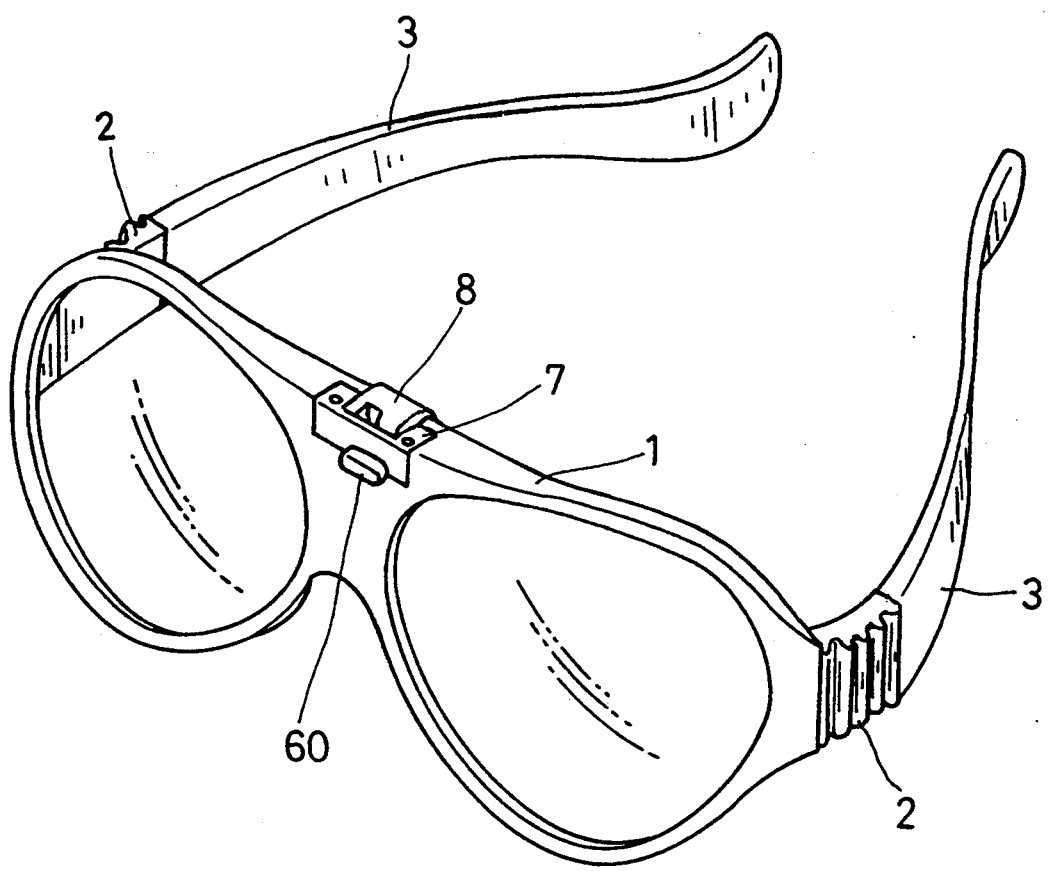
FIG. 2: A drawing showing the components of the eyeglasses pertaining to the practical example of the present invention.

The eyeglasses designed to facilitate carrying pertaining to the present invention is assembled in the following manner. As shown in FIGS. 1 and 2, said two protruding strips 20 are inserted into said insertion slots 22 respectively, and the joining groove 30 of said temple 3 is inserted into said protruding strip 21. Said two springs 4 are then inserted into the insertion slots 102 of said housing slot 10, followed by the insertion of said pressing piece 5 and pawling piece 6 into said housing slot 10 in said order. Additionally, the protruding piece 61 of said pawling piece 6 is allowed to rest on the curved slot 500 of said pressing piece 5, so that the supporting shaft 62 can be inserted into the shaft hole 104 of said housing slot 10. Next, the two protruding rods 800 on said clip 8 are inserted into the two insertion holes 720 of said positioning unit. The final step involves screwing the set of screw bolts N into the threaded holes 70 and 101, thereby fastening said positioning unit 7 onto the eyeglasses frame 1, as shown in FIG. 2.

Figure 4:
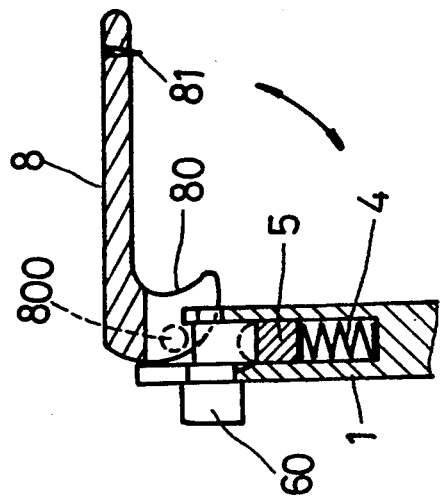
FIG. 4: A side dissection view pertaining to a configuration wherein the switch is on the right side.
Figure 3:
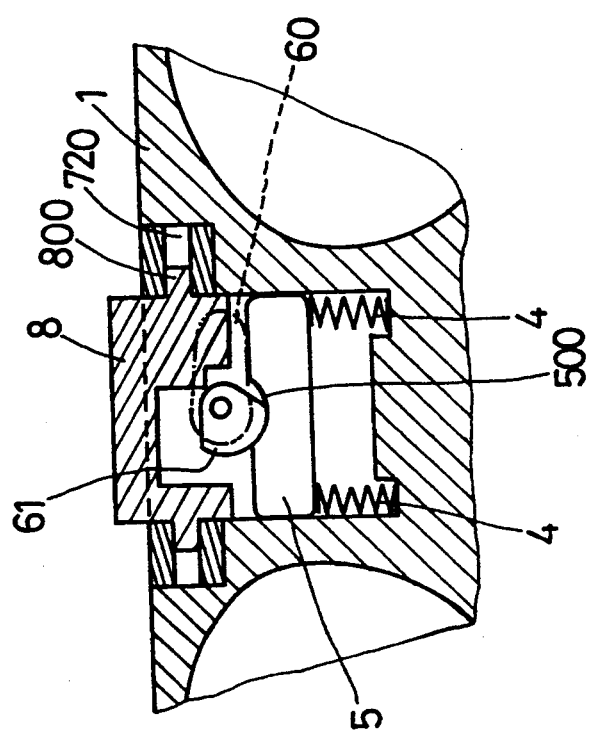
FIG. 3: A front dissection view pertaining to a configuration wherein the switch is on the right side.
Figure 5:
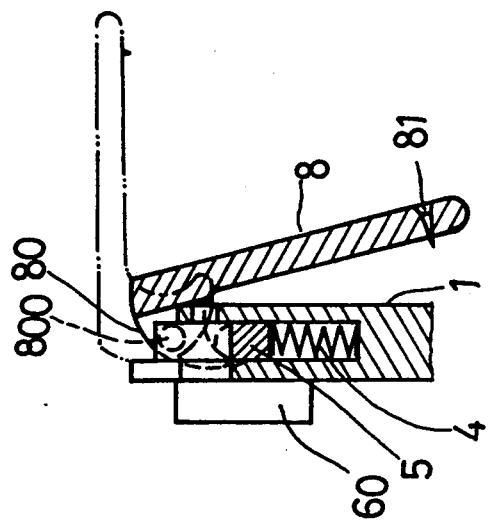
FIG. 5: A front dissection view pertaining to a configuration wherein the switch is on the lower side.
Figure 6:
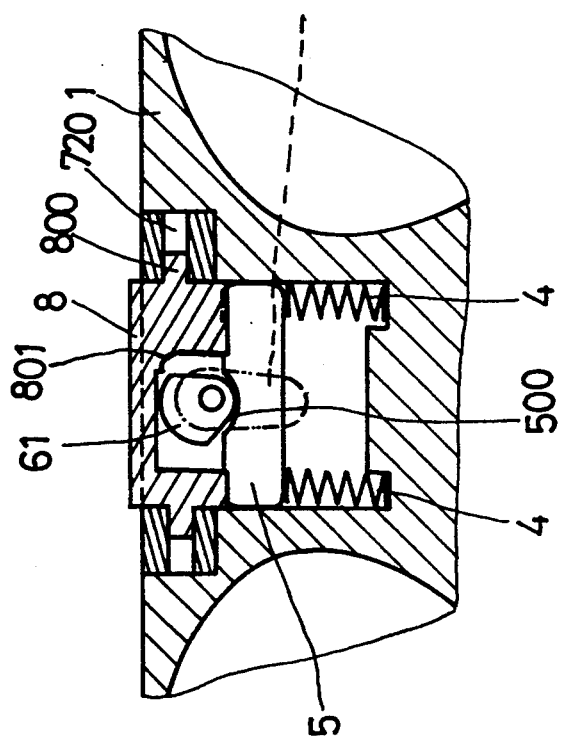
FIG. 6: A side dissection view pertaining to a configuration wherein the switch is on the lower side.
Figure 8:
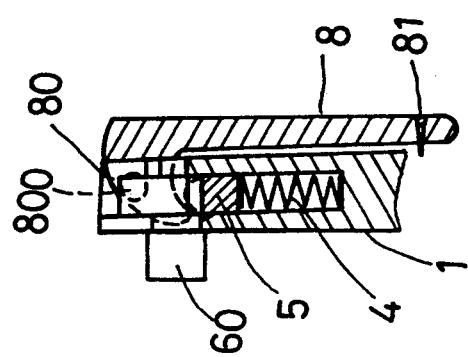
FIG. 8: A side dissection view pertaining to a configuration wherein the switch is on the left side.
Figure 7:
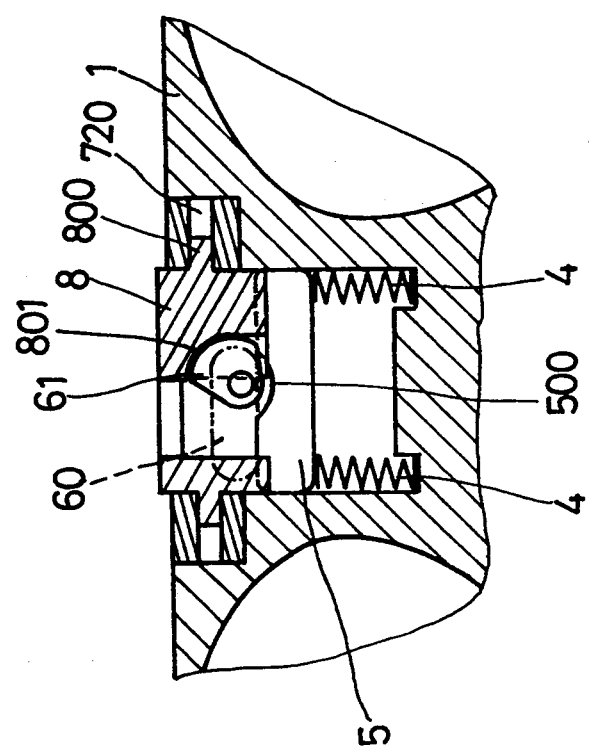
FIG. 7: A front dissection view pertaining to a configuration wherein the switch is on the left side.
Figure 9:
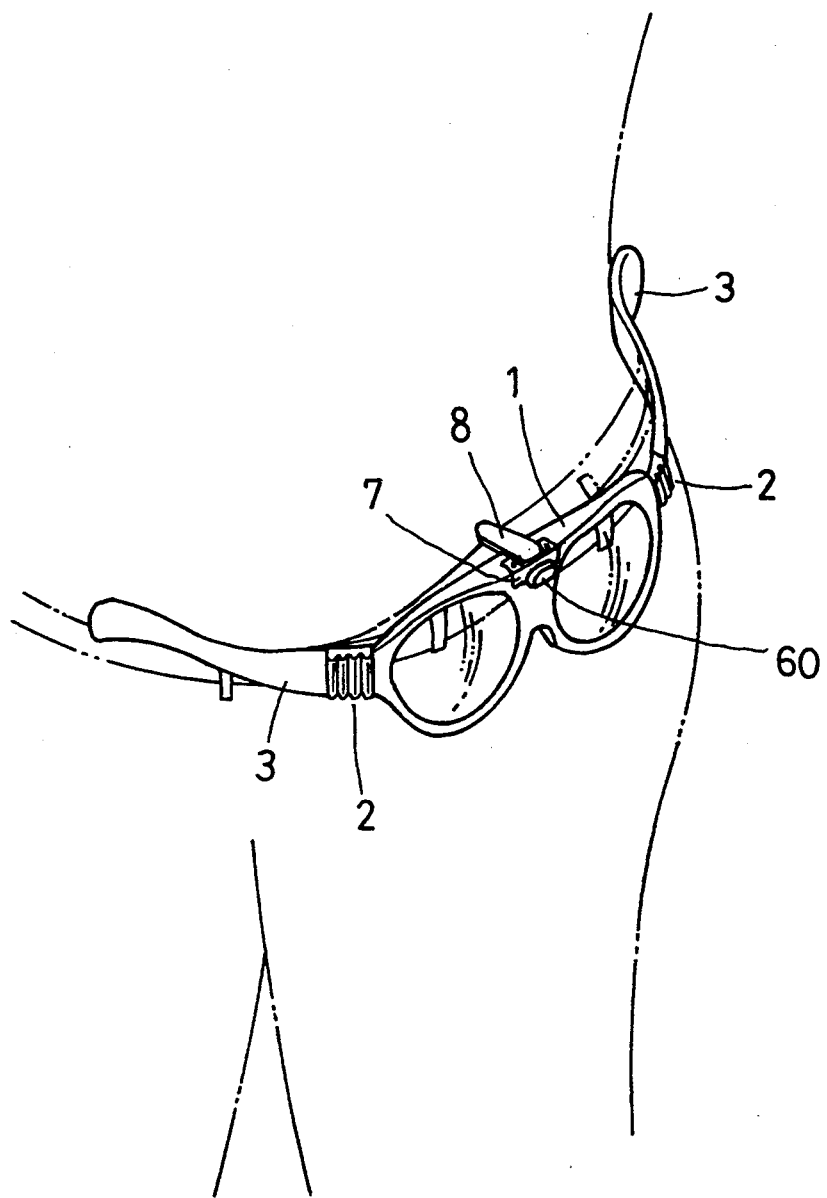
FIG. 9: A drawing showing the deployment of the clip pertaining to the practical example of the present invention.
Figure 10:
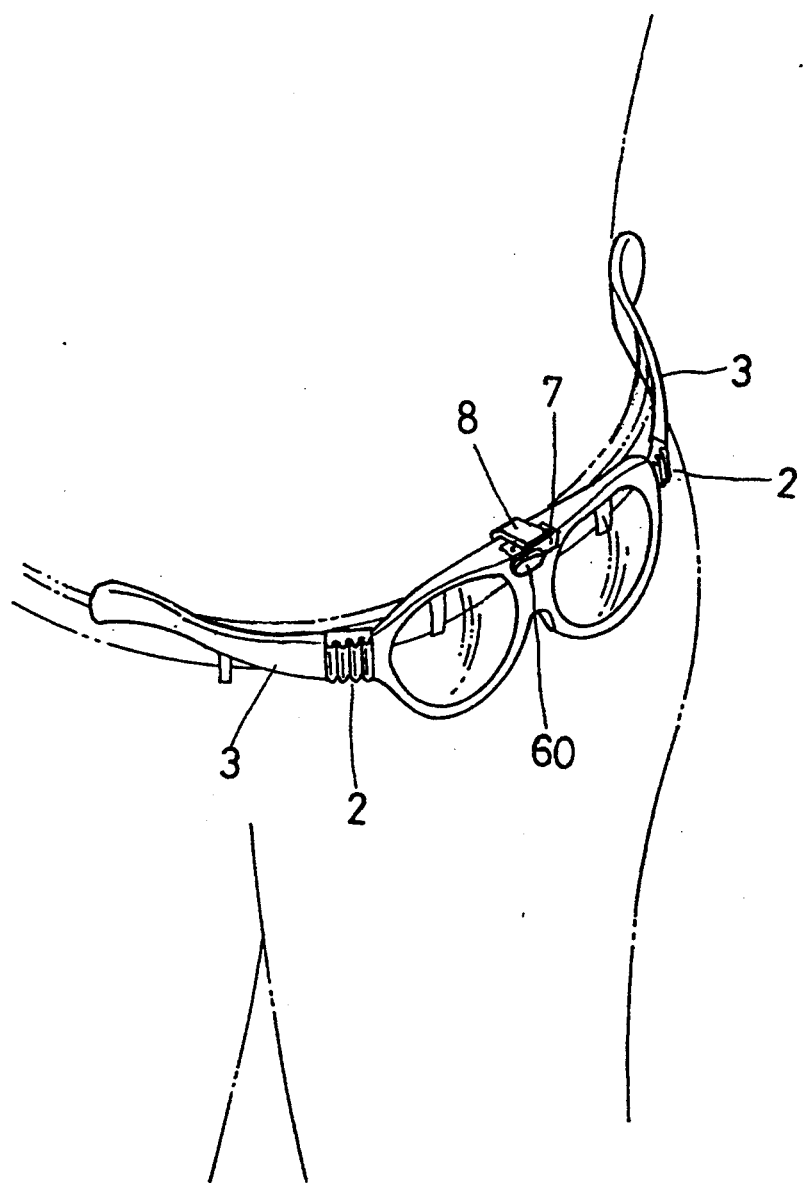
FIG. 10: A drawing showing the deployment of the clip pertaining to the practical example of the present invention.

The following steps are involved in attaching the pair of eyeglasses to the waist or a belt. First, the switch 60 of said pawling piece 6 is turned to the right side or downward, causing said clip 8 to move upward and arrive at a position which is perpendicular to said positioning unit 7, as shown in FIG. 4. Next, the pair of eyeglasses is then attached to a belt or the waist, as shown in FIG. 9. Under said configuration, the lobe of said eccentric protruding piece 61 presses against the curved slot 500 of said pressing piece 4, as shown in FIGS. 3 and 5. Accordingly, said pressing piece 5 and clip 8 are not bound to each other, as shown in FIGS. 4 and 6, allowing said clip 8 to rotate freely. After the pair of eyeglasses in secured onto the belt or waist, said clip 8 is pushed downward, as shown in FIG. 8 and the switch 60 is rotated to the left, thereby releasing the protruding piece 61 from the curved slot 500 of said pressing piece 5 and causing said protruding piece 61 to bind to the positioning slot 801 of said clip 8, as shown in FIG. 7. Under this configuration, said clip 8 cannot be turned, as shown in FIG. 8, allowing the clip pin 81 to bind tightly onto the belt. Additionally, the elastic pieces 2, which are shaped like an accordion, and the set of temples 3 are designed to be elastic, so that the pair of eyeglasses can be bound securely onto the belt, as shown in FIG. 10. In comparison with conventional eyeglasses, eyeglasses designed in accordance with the present invention are less likely to be lost or misplaced.

The removal of the pair of eyeglasses from the waist or belt simply requires turning the switch 60 downward or to the right, as shown in FIGS. 3 and 5, so that said protruding piece 61 presses against on the pressing piece 5, causing said pressing piece 5 to move downward, which, in turn, compresses the springs 4. According, said pressing piece 5 and clip 8 against are not bound to each other, as shown in FIGS. 4 and 6, allowing said clip 8 to be turned upward and removing the pair of eyeglasses from the belt, as shown in FIG. 9.

As clearly shown in the aforesaid practical example, the eyeglasses designed in accordance with the present invention are effective, novel and more practical than conventional eyeglasses, and possess the following merits:

1. The eyeglasses pertaining to the present invention are designed to facilitate carrying and prevent mishaps, such as misplacing and dropping the eyeglasses, from occurring.

2. The eyeglasses pertaining to the present invention, which are designed to be attached to ta belt, are attractive and fashionable.

3. The elastic pieces, which are shaped like an accordion, and the set of temples are designed to be elastic, so that the pair of eyeglasses can be bound securely onto the belt, not affected by the waistline of the user.

I claim:

1. Eyeglasses comprising:
    (1) a frame, wherein the two sides of said frame each possesses a vertical insertion slot
    (2), a set of elastic pieces, wherein the front and rear sections of said elastic piece each possesses a protruding strip, one end of said elastic piece is to be inserted into said vertical insertion slot, and said elastic piece is equipped with a flexible section, with the outer side thereof being shaped like an accordion, and
    (3) a set of temples, wherein said temple is curved and the front thereof is equipped with a joining groove with which said temple is attached onto said protruding strip of the other end of said elastic piece,
which is characterized by the fact that the middle of the upper part of the frame is equipped with a housing slot, with the two sides of the upper part thereof being equipped with a first set of threaded holes and the two sides about the center of said housing slot each being equipped with an insertion slot, that the front of said housing slot possesses a half-circle recessed slot, and the rear of said housing slot is equipped with an elevated shaft hole, that a spring is inserted into each of said two insertion slots, and a pressing piece is placed on said two springs, that the upper part of said pressing piece is equipped with a curved unit, and the middle thereof possesses a curved slot onto which a pawling piece is to be placed, that one side of said pawling piece is equipped with a switch, and the other side is equipped with an eccentric protruding piece, with the outer side thereof equipped with a supporting shaft, that a positioning unit is fastened onto the said housing slot by means of a set of screw bolts, that the two sides of the upper part of said positioning unit are each equipped with a second set of threaded holes in alignment with said first set of threaded holes on said housing slot, and the lower side of the front section of said positioning unit is equipped with a recessed slot that corresponds with the half-circle recessed slot located on said frame, that the rear of said positioning unit is equipped with a notch, and the two sides of said notch are each equipped with an insertion hole, that a clip is mounted inside the notch of said positioning unit, with the front two sides of said clip each possessing a hook, bending downward, that the outer sides of said pair of hooks each possesses a protruding rod, and the inner side of one of said hooks is equipped with a positioning slot, that the rear of said clip is equipped with a clip pin, that the eyeglasses assembled is removably attached onto a belt by means of the clip on the bridge of the frame to facilitate carrying and preventing misplacing and dropping the eye glasses, and that the elastic pieces, which are shaped like an accordion, and the set of temples are designed to be elastic, so that the pair of eyeglasses is bound securely onto the belt when desired, and not affected by the waistline of the user.

* * * * *